United States Patent [19]

Wesch

[11] Patent Number: 4,657,623
[45] Date of Patent: Apr. 14, 1987

[54] PROCESS AND APPARATUS FOR THE MANUFACTURE OF TUBULAR HOLLOW BODIES AND THE USE THEREOF

[75] Inventor: Ludwig Wesch, Heidelberg, Fed. Rep. of Germany

[73] Assignee: Heidelberger Zement AG, Heidelberg, Fed. Rep. of Germany

[21] Appl. No.: 115,219

[22] Filed: Jan. 25, 1980

[30] Foreign Application Priority Data

Jan. 26, 1979 [DE] Fed. Rep. of Germany ....... 2903019

[51] Int. Cl.$^4$ ............................................. B32B 31/00
[52] U.S. Cl. .................................. 156/429; 156/187; 156/195; 156/446
[58] Field of Search ............... 156/446, 392, 195, 184, 156/190, 191, 192, 187, 188, 425–432

[56] References Cited

U.S. PATENT DOCUMENTS 3,799,818 3/1974 Bulters et al. ................... 156/187 X
4,006,049 2/1977 Gardner .......................... 156/392 X

FOREIGN PATENT DOCUMENTS 5702 1/1932 Australia .............................. 156/195

*Primary Examiner*—David Simmons
*Attorney, Agent, or Firm*—Hopgood, Calimafde, Kalil, Blaustein & Judlowe

[57] ABSTRACT

The invention relates to a method and apparatus of manufacture of fiber reinforced tubular bodies which comprise in combination at least on cover layer and at least one core layer; said layers being wound upon a winding mandrel the shape of which corresponds to the desired shape of the hollow body. The method includes the use of a control unit which comprises a compression tunnel adapted to reduce the thickness of the core and cover layers thereby applying compressional and tensile forces simultaneously to the layers resulting in a more homogeous and therefore stronger bond between the layers.

7 Claims, 6 Drawing Figures

PROCESS AND APPARATUS FOR THE MANUFACTURE OF TUBULAR HOLLOW BODIES AND THE USE THEREOF

This invention relates to a process and apparatus for manufacturing hollow bodies. The hollow bodies to be produced in accordance with the invention include in particular tubes, although other hollow bodies such as containers, for example spherical containers, are included.

A method of manufacturing tubes which are reinforced with fiberglass is already known (French Pat. No. 70 070 35). In this patent, tapes consisting of a cover layer and a core layer are wound helically in overlapping fashion on a winding mandrel. The cover layer may be formed of paper, fabric, or the like, while the core layer consists of a "plastic mortar" which, in addition to plastic, for instance polyester resin, epoxy resin or the like, may contain glass fibers as fillers. This "plastic mortar" forms, so to speak, a spacer for the cover layer upon winding on the winding mandrel and the lower layers of tape already wound on the winding mandrel. The core layer is applied to the cover layer in such a manner that the "plastic mortar" or the material of the core layer drops from a downward tapering hopper onto the cover layer which is used as a support tape. The cover layer, together with the material spread on it, travels through the gap formed by two rollers so that the gap between the rollers determines the thickness. The support tape which forms the cover layer serves at the same time as a conveyor belt. It has, been found however that unless additional measures are taken, which increase the expense for manufacture, or unless very special materials are used, the tubular bodies produced in this manner frequently do not have sufficient intrinsic strength. Moreover, delamination often occurs between cover and core layers on the one hand and between the cover layer of the one layer of tape and the core layer of the layer of tape wound on top of it.

In this type of process is it also known (U.S. Pat. No. 2 614 058) to produce the cover layer only after applying the core layer to the winding mandrel by winding a tape or threads helically over the core layer. The cost of manufacture in this case is even higher and even here problems result when importance is placed on the most intimate possible bond between the cover and core layers. This true even if the cover and core layers are not wound around a winding mandrel but are so arranged within a "tubular body" having a hollow interior, which in this case also is to be considered as falling under the concept of "winding mandrel". Within the scope of this alternative it is also known (U.S. Pat. No. 3 232 812) to have the core-layer material which emerges from the bottom of a filling hopper enter into a roller gap which is formed by the ring-shaped inner side of the "winding mandrel" and a guide roller which is located within the "winding mandrel" and serves to feed the cover layer, which is in the form of a tape.

Finally, it is known to wind resin-impregnated glass-fiber rovings helically on hollow bodies in order to improve the physical properties thereof (U.S. Pat. No. 3 177 902 and U.S. Pat. No. 3 874 972).

The object of the present invention is to obtain through a simple process hollow bodies having good physical properties and particularly a high strength even under dynamic loads; for this, a good bonding of the cover and core layers to each other is essential in order to eliminate the danger of delamination.

In accordance with the invention, the core layer is substantially uniformly compressed and brought into contact with the cover layer before it is wound onto the winding mandrel and the tensile forces which are then produced upon the winding contribute to favoring this action. Due to the fact that lateral evasion of the core layer is not possible, as it is when the core layer passes through a roller gap, this lateral evasion is avoided by a control unit developed as a compression tunnel, there is a substantial avoidance of inhomogeneities in the finished hollow body, which were frequently the cause of stress cracks and therefore of too low a load-carrying capacity of the hollow bodies.

By a compression tunnel there is produced a control unit which completely surrounds the material of the core layer and the cover layer so that it serves not only for controlling the thickness of these two layers but also acts to compress the element at the edges.

The advantage of this combination of features resides in the fact that not only does the cover layer consist of a support tape but also, the support tape or rovings form a part and are embedded in the cover-layer material which has a similar composition as that of the core-layer, the result of which is that a particularly good homogeneity of the entire hollow body is obtained. To this extent there can also be used for the cover layer support tapes and rovings which have openings therethrough such that core-layer material may pass. This type of cover layers were avoided in the previous processes in which the cover layer, developed as support tape, served as the lower limitation of the unit consisting of the core layer plus cover layer within the control unit and In the present invention, on the other hand, due to the positive compressing of the material of the core-layer/cover-layer unit the "plastic mortar" can also be present below the support tape or on the side thereof facing away from the core layer upon departure from the compression tunnel so that when the core-layer/cover layer unit travels onto the winding mandrel such material is present on the outside and not merely on the relatively smooth side of the support tape. The advantageous consequence of this is a better bonding upon the winding thereon of another core-layer/cover-layer unit, without intermediate measures such as the spraying-on of an adhesive being necessary.

In other words in the instant invention the material which is used for the core layer and possibly for a part of the cover layer not only comes into contact within the control unit with a support tape which forms a part of the cover layer, but in addition it is pressed therein against the support tape due to the compression tunnel which decreases gradually in its free cross section of passage in the direction of conveyance. Moreover, upon winding this layer-unit onto the winding mandrel the pasty but hardenable material which forms the core layer, and possibly a part of the cover layer, is pulled along under tension, thereby further compressing the material, so that the modulus of elasticity of the material to be hardened is at a maximum as compared with the material which has been hardened but has not been compressed in accordance with the invention.

When it was stated above that the compression tunnel determines the cross section of the core-layer/cover layer unit and surrounds the latter on all sides, this applies for the relatively porous or viscous material which is fed to the compression tunnel by a hopper or through a pressure hose, i.e. a positive feeder. On the other hand, the compression tunnel can be provided with slots through which a part of the support tape arrives outside the cross section of the tunnel as is further explained in the examples with reference to the drawings. In this way, the core-layer/cover-layer unit leaving the compression tunnel has a main part and an appended secondary part. The main part is determined by the place of the smallest cross section of passage of the compression tunnel through which at least parts of the support tape or rovings and other shaped parts fed pass, as well as the mass fed by the positive feeder, said mass suitably consisting of synthetic resin and additives or fillers. The secondary part consists of the parts of the support tape which extend through the slot of the compression tunnel to outside of the free cross section of passage. If this unit consisting of the main part and the secondary part travels onto the winding mandrel and if a winding, and particularly a helical winding takes place there, then the formation of a bead upon the lapped winding of adjacent layers is substantially prevented since the secondary part has a thickness which is negligible as compared with the principal part. Nevertheless, a good anchoring of the adjacent tape layer is obtained since the secondary part or the part of the support tape forming this secondary part is integrated into the neighboring layer. In addition it is also possible to deflect the secondary part out of the plane of the tape layer, as is advisable when the tape layer in question comes to lie against the end side of the hollow body. In this connection it is advisable to raise the secondary part or the "side tape" formed thereby so that it is arranged in a plane which is perpendicular to the axis of the winding mandrel.

The core-layer/cover-layer units which leave the compression tunnel should have a thickness of between about 3 and 40 mm and preferably a thickness of about 10 mm. If hollow bodies of thicker walls, particularly tubes, are desired, it is desirable to wind several such units on or over each other. If the width of the unit is less than the length of the hollow body, then it is advisable to use the step-by-step method wherein one layer of the hollow body is produced by helical winding the cover-layer/core-layer unit and thereafter helically winding the next layer in reverse direction over the lowermost layer.

It has been found that the instant invention affords numerous advantages in the art of manufacturing tubes. The present method and apparatus provides stable fiberglass-reinforced tubes which can withstand high dynamic loads and which can be produced at relatively low cost. The hollow bodies made in accordance with the present invention are normally removed from the winding mandrel after the solidification of the units or tape layers wound on the winding mandrel.

As binder for the material forming the core layer and in part the cover layer it is advisable to use synthetic resins, examples of ones which have proven particularly suitable being given below. In addition thermoplasts, thermosetting resins may also be used.

As filler materials for this composition there can be employed, in addition to fibers and particularly glass and asbestos fibers, substances such as quartz sand, ground quartz and other agents, as well as heat-insulating agents, pumice, blown clay or the like.

For reinforcement, the known rovings, in particular rovings of glass fibers, can be used.

As support tape there should be employed—for better bonding to the other composition—a tape which has at least recesses and preferably holes so that the composition not only is mechanically anchored to the support tape but can even pass through it and thereby embed the support tape uniformly in the composition. For this purpose there may suitably be employed not only a thermoplastic sheet but in particular a fabric, and it is advisable to use a fabric the warp and filling threads of which are so arranged that the tensile forces which occur upon the winding on the winding mandrel do not cause any change in the width of the support tape. Otherwise advantages obtained by the invention with respect to the homogeneous compacting in the compression tunnel might be partially lost.

It is particularly advantageous if the support belt, the rovings, or possibly other embedded shaped bodies are soaked or preimpregnated with synthetic resin before introduction into the compression tunnel, such that the strength of adherence, as a result of the chemical bonds, between these shaped bodies and the rest of the composition is increased.

In addition to this it is advisable to heat the compression tunnel so that the composition which moves along same becomes more consistent and its viscosity is reduced. Nevertheless, this cover-layer/core-layer unit or this tape layer should still be sufficiently consistent upon the winding to make the aforementioned tensile-force effect possible.

In addition to being used for the manufacture of tubes, the present invention is also suitable for the manufacture of large containers such as bins, or main parts of tanks or tank cars, fuel oil containers, pressure tanks, and the like which are spherical shape. The present invention, may also be employed for the wrapping of heating pipes and conveyor or sewage pipes which are already prefabricated and consist, for instance, of steel, aluminum, a copper-nickel-iron alloy, earthenware, wood, paper or cardboard. In this case these tubes form the winding mandrel and the tape layers wound thereon remain anchored on this winding mandrel after hardening. This measure permits a simple improvement—and one which is obtainable also on a large industrial scale—of such pipes with respect to heat losses, electrical or other insulating capacity as well as protection against damage, i.e. for industrial packaging purposes.

The invention will be described in further detail below with reference to the drawing and specific examples. In the drawing.

Figure 1:
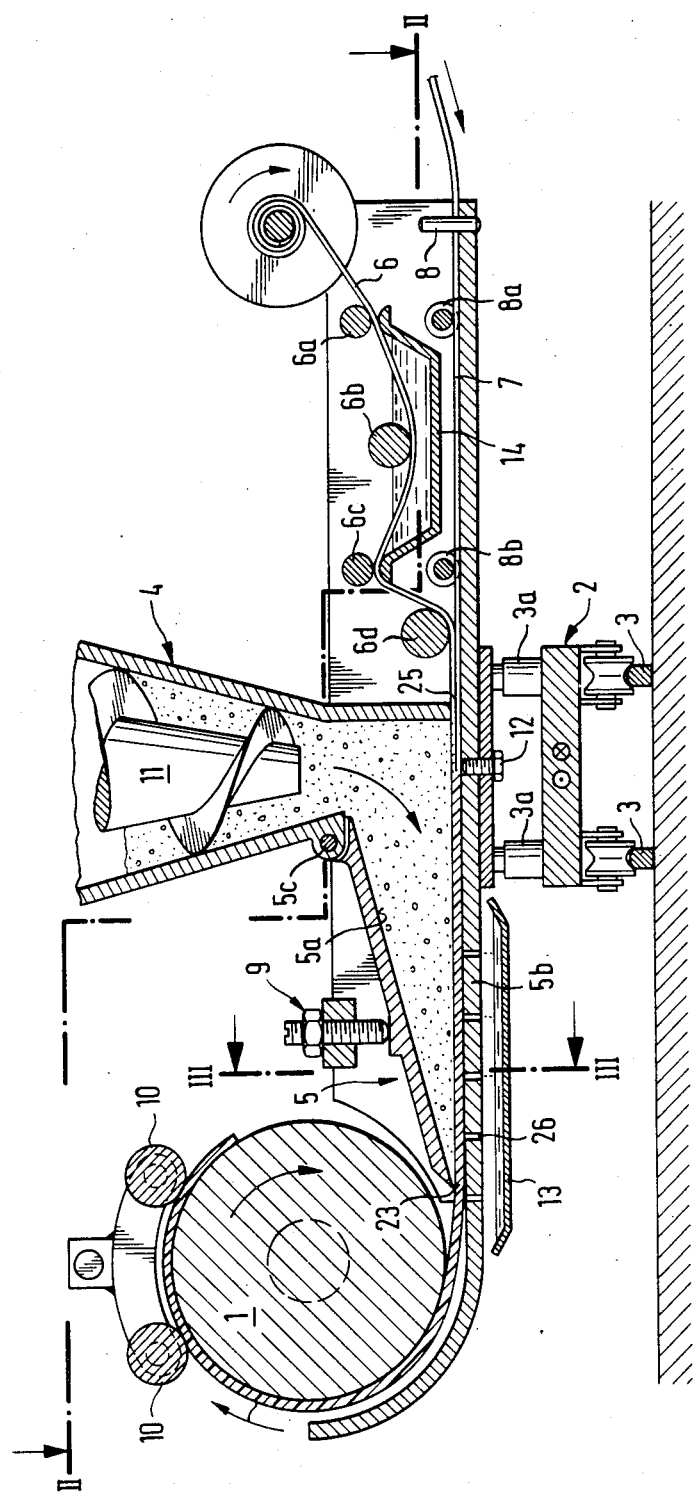
FIG. 1 shows diagrammatically in cross section a the apparatus in accordance with the invention and FIG. 2 is a top view of the apparatus shown in FIG. 1.
Figure 2:
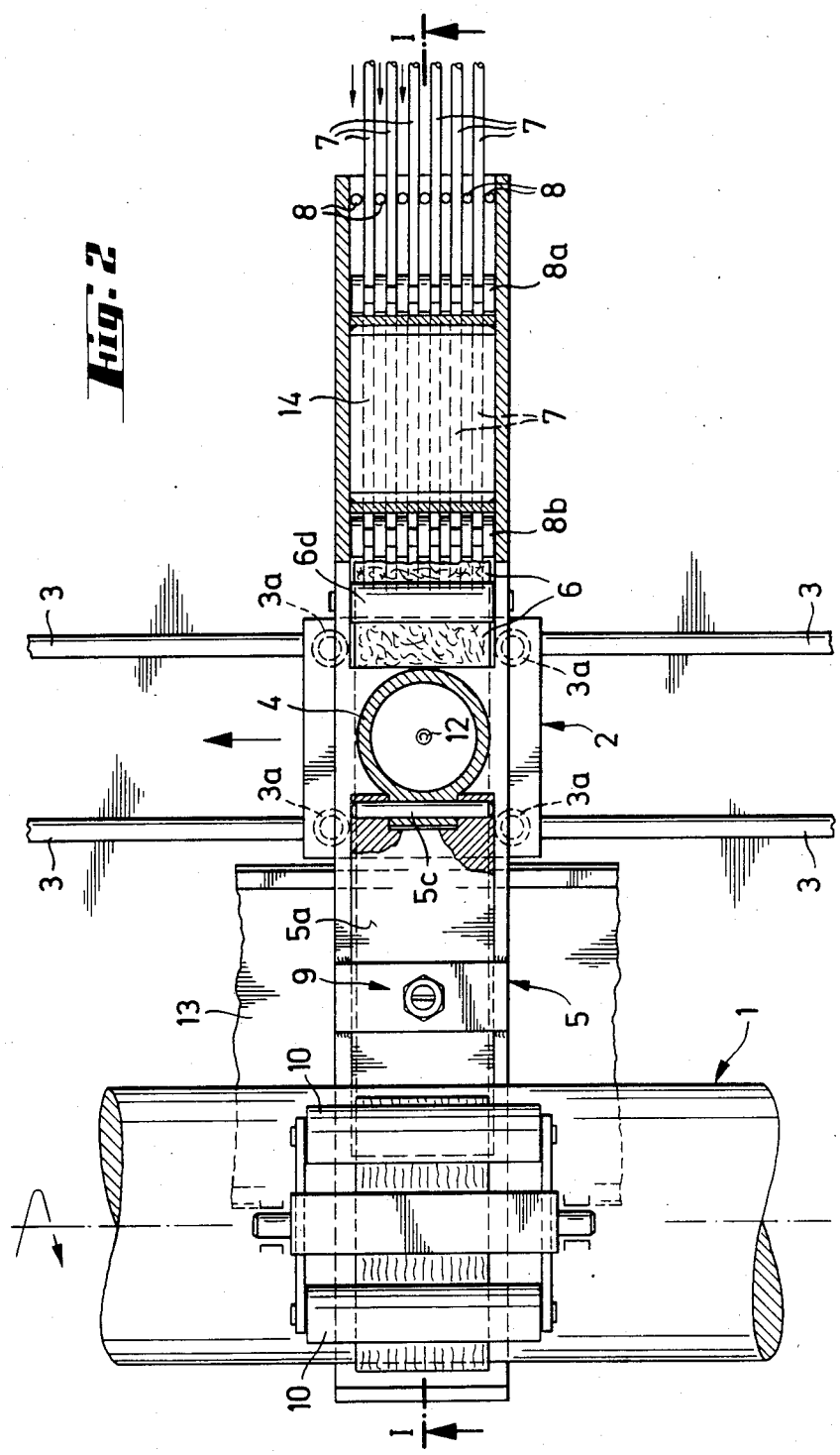

Referring to FIGS. 1 and 2, a tape layer or core-layer/cover layer unit whose cross section is determined by the compression tunnel 5, i.e. its free cross section of passage at the dimensionally narrowest place or constriction 23 (FIG. 5) is wound on winding mandrel 1 which is developed as a roller of circular cross section. The mixture of the material employed for the formation of the core layer is fed from hopper 4, and comes into contact with support tape 6 and rovings 7 (roving strands), at the entrance point 25 of compression tunnel 5. The core mixture travels with support tape 6 and rovings 7 through the narrowing compression tunnel 5 the cross section of the discharge gap of which at the constriction 23 is adjustable by means of an adjusting device 9 which swings upper inner wall 5a (FIG. 3) around swivel point 5c. The adjustment device 9 can comprise a screw. The compacting or compression in the compression tunnel 5 also affords the possibility of compacting the composition in such a manner that its modulus of elasticity reaches a maximum.

The pasty or plastic mass which is fed by hopper 4 has at times various amounts of synthetic resin and solid bodies, called "matrix materials." With the In the present invention it is possible to remove the excess resin—or else excess matrix material during the course of the compression by providing the lower side of the compression tunnel 5, i.e., inner wall 5b, with openings 26. The lower inner wall 5b may have a finely divided system of holes but it may also consist of a fine wire netting. In order to control the consistency of the composition this perforated tape system can be adjustable by means of a slide with respect to its passage capacity for the composition or individual components of the composition.

On the movable transport truck 2 which moves via a guide system, i.e., guide rods 3, along the arial direction of winding mandrel 1, there is located the winding device for the tape layer or for the core-layer/cover-layer unit. This winding device is built on the platform of transport carriage 2 and can be adjusted in its angle with respect to the winding mandrel 1 by holding screws 12 (FIG. 2), whereby the "winding speed" is determined in combination with the speed of upon which transport carriage 2 moves along winding mandrel 1. The platform itself is constructed on a vertical centering device, for instance on four hydraulic cylinders 3a; thereby making it possible to set the winding device at a precise distance from winding mandrel 1.

Via the hopper 4 which contains a motor-driven conveyor worm 11 the core material is pressed onto the support tape 6 which is fed via rollers 6a, 6b, 6c, 6d through an impregnating bath 14. The roving strands 7 travel along over a comb element 8 which determines their mutual distance apart and is located below the support tape 6; rollers 8a, 8b, which are preferably grooved, hold the rovings 7 in their position. The roving strand are also preferably impregnated with synthetic resin in an impregnation bath. The collection trough 13 receives the excess synthetic resin which passes through the bottom or the perforated lower inner wall 5b.

Figure 4:
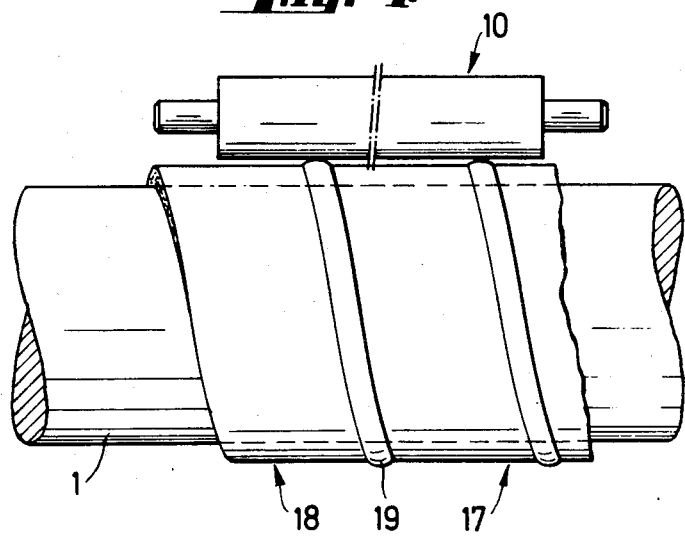
FIG. 4 is a diagrammatic view of the tape layers wound on a winding mandrel shortly before the applying of the smoothing roller.

Smoothing rollers 10 serve, in accordance with FIG. 4, to smooth any beads between adjacent layers of tape which may possibly be produced upon overlap winding; in this way a further compressing which is now limited to the region of overlap is obtained, which even further increases the strength without any substantial inhomogeneity being produced in the hollow body.

It is particularly advantageous if, for instance, instead of the hopper 4 or in addition thereto, a pressure hose is used as positive conveyor, the compression tunnel 5 being connected to its end; by the use of pressure the composition is conveyed through the pressure hose and the compression tunnel 5.

Figure 3:
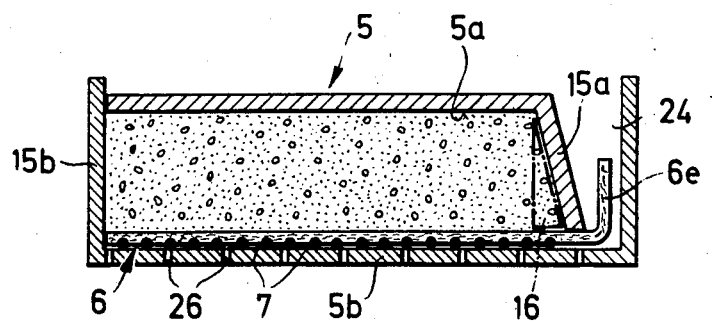
FIG. 3 is a diagrammatic cross section through the compression tunnel.

In the development of the compression tunnel 5 shown diagrammatically in FIG. 3 it can be noted that the core composition is located strictly within the free cross section of the passage which is determined by upper inner wall 5a, lower inner wall 5b, and side walls 15a, 15b. Only a part of the support tape 6 extends through the gap between the oblique side wall 15a and lower inner wall 5b into side channel 24; this secondary part or edge 6e of support tape 6 is deflected upward by 90°. The somewhat oblique inclination of one side wall 15a has proven advantageous inasmuch as in this way a strictly rectangularly shaped cross section of the tape layer and of the main part of the core-layer/cover-layer unit is not obtained. The part or gusset 16 of the triangular shape in cross section contains a certain excess of material which assures that upon the travel of the tape layer onto the winding mandrel 1, as shown in particular in FIG. 4, no gap will be produced between adjacent turns 18. At the same time, edge 6e lays itself within the region of the strand overlap 19 over the immediately preceding tape layer 18 without practically any bead resulting.

Figure 5:
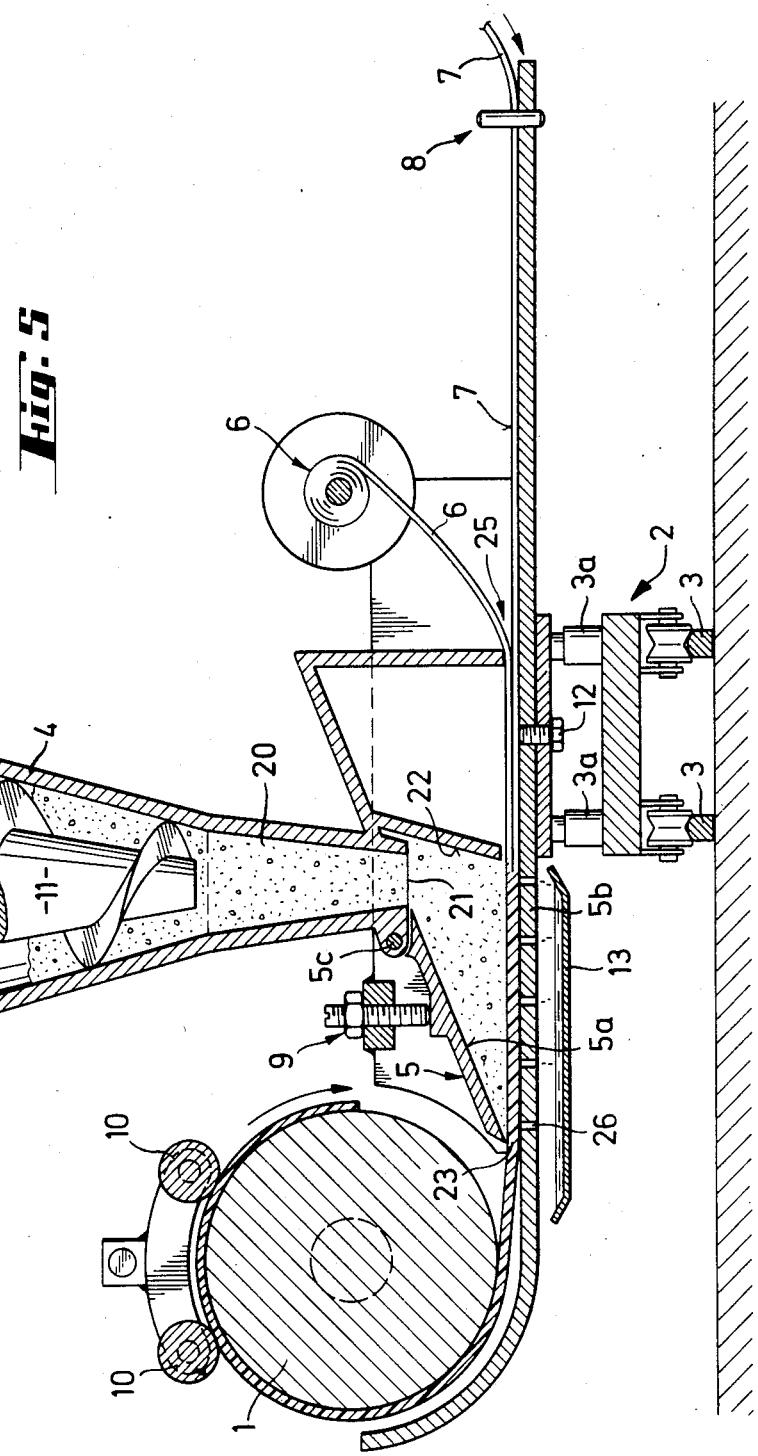
FIG. 5 shows another embodiment of the invention seen diagrammatically in cross section and FIG. 6 is a plan view of a support tape consisting of three parts.

In order to be able to apply the apparatus to machines which have only a slight distance between winding mandrel 1 and carriage 2, it has been found advisable to provide hopper 4 of FIG. 5 with a lower hopper part which has downwardly diverging walls and serves for the precompressing. Within the compression tunnel 5 an oblique deflection wall 22 is furthermore arranged in this connection directly below this lower hopper part 20 so as to effect a certain predeflection of the core composition fed by the hopper 4. It is self-evident that the core composition delivered through inlet point 21 must be so adapted to the advance of the support tape 6 or roving 7 that no accumulation of material takes place in the compression tunnel 5 proper. By measuring the velocities and amount conveyed by the conveyor worm 11, the speed of the tape may be effected automatically with the aid of electronic apparatus.

The advantage of the "double compression" system is due to the fact that although the conveyor strand and the roving strands are relieved of tension by the compressing tunnel 5 an optimum compressing of the material is at the same time obtained.

Another simplification resides in the fact that the compressing tunnel 5 is flanged in a reduced-size embodiment directly onto the hopper 4 and this plant is placed directly on the edge of the winding mandrel 1 so that the compressed core material passes immediately to the winding mandrel 1.

As already stated, support tape 6 and possibly rovings 7 should be impregnated with resin before introduction into the compression tunnel 5, which can be done by an immersion and/or spray process. The impregnation resin can be prepolymerized by infrared radiation. If a certain preheating also takes place within the compression tunnel 5 then the total curing time of the tube produced after the winding on the winding mandrel 1 is shortened.

Furthermore, a layer, in particular a reinforced gelcoat layer, can be applied to the winding mandrel 1 before the winding on of the first tape layer. On it there can also first of all be wound an inner cover layer in the manner that rovings 7 alone or together with the support tape 6 are wound on, possibly in addition to a certain amount of core material.

Support tape 6 preferably consists of thin glass fabric in the form of a three-dimensional structure, although fabrics or non-wovens of organic threads can also be used.

Figure 6:
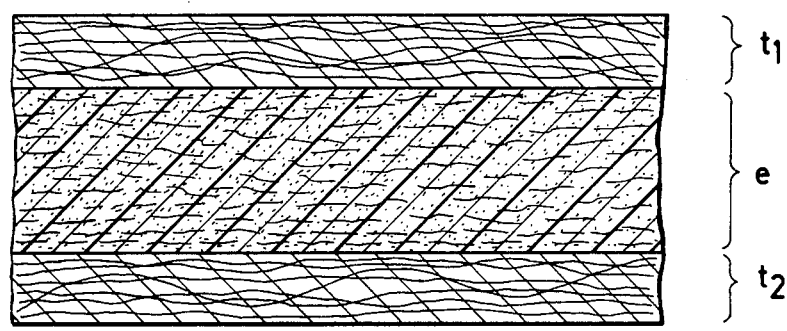

For tubes of a nominal diameter of, for instance 30 cm it is advisable to select the thickness of the core layer between 3 and 15 mm. Upon conversion of the production to tubes of a nominal diameter of 60 cm it is then advisable to wind two tape plies one above the other without changing the compression tunnel 5; in certain cases the layer thickness of the tape layer can be changed by changing the constriction 23 of the compression tunnel 5. It has been found that it is better to arrange several tape layers or core-layer/cover-layer units of relatively slight thickness one above the other if the shear strength and the outer load-bearing capacity, particularly with respect to transverse forces, is to be high. In particular, in the case of tubes which are stressed in flexure, this "tube sandwich system" should be of relatively stiff adjustment such that the stresses are then so distributed that the lowest stresses occur in the core and, corresponding to the modulus of elasticity, with approximately the same elongation the highest stresses prevail in the outer layers. These layers can be maintained thin, in particular in accordance with FIG. 6, if, for instance, materials of high ultimate tensile stress are used for the support tape 6 and rovings 7, as for the example the threads of so-called "E glass" (boron-aluminum silicate), carbon, graphite, boron, tungsten or else thin steel wires. The support tape 6 at the same time assumes the task of reducing the shear stresses which occur between the core e and the cover layer or the outer layers t1, t2. In this connection, the elongation of the cover layer should preferably amount to twice the elongation of the core layer or even more.

EXAMPLE

The following composition recommends itself for the

| cover layer: | |
|---|---|
| Resin mix: | |
| Unsaturated polyester resin | 294 T, produced by the CDF Chemi, 80 parts by weight |
| Unsaturated polyester resin (soft resin) | 20 parts by weight |
| Methyl ethyl ketone peroxide | 1 part by weight |
| Retardant | 0.1 part by weight |
| Glass roving 60 threads | 1 layer |
| Polypropylene fabric | 1 layer |

In each 1 mm of layer thickness there should be contained: 50 wt% glass, 40 wt% resin mix, 10 wt% organic fabric. The modulus of elasticity of the cured cover layer is: $E_t = 160,000$ kgf/cm$^2$; the elongation under tension upon rupture is 2% and the elongation under tension upon rupture of the polypropylene layer is >8%.

The following composition is selected for the

| core layer: | |
|---|---|
| Resin mix: | |
| Unsaturated polyester resin | 70 parts by weight of 294 T |
| Unsaturated polyester resin | 30 parts by weight (soft resin) |
| Methyl ethyl ketone peroxide | 1.5 parts by weight |
| Retardant | 0.2 part by weight |
| Mixture of the fillers | |

| -continued | |
|---|---|
| core layer: | |
| Resin mix: | |
| Sand of a particle size of 0.8-1.2 mm | 80 parts |
| Cut glass fibers (length of 7-12 mm) | 10 parts |
| Aerosil | 3 parts |
| Ground quartz | 7 parts |

100 parts of the filler mixture are introduced into 20 parts of the resin mix. In cured condition, the core mixture has a modulus of elasticity Ec of 80,000 kgf/cm$^2$ and its elongation upon rupture is about 1.6%.

Such a tube has, with a diameter of 30 cm, a cover-layer thickness t of 1 mm, a core thickness c of 15 mm, and a stiffness $S_b$ of 43,000 kgf cm, calculated in accordance with the formula:

$$S_b = E_c \cdot \frac{b \cdot c^3}{12} + 2 E_t \left[ \frac{b \cdot t^3}{12} + b \cdot t \left( \frac{c + t}{2} \right)^2 \right]$$

The peak pressure upon rupture, measured in accordance with DIN, is 3500 kgf/cm$^2$. The polypropylene fabric of the cover layer can also be replaced by a polyester fabric or a foil. Upon manufacture it is advisable to heat the two briefly to above the incipient melting point of the fabric during the polymerization. This is effected in part by the polymerization temperature and in addition by heat which is fed from the outside. In this way an anchoring of the fabric for the better equalization of shear in the core layer on the one hand and in the threads of the cover layers on the other hand can be obtained.

Instead of the polyester resins other resins and particularly thermosetting resins can be used. Thus resins of the epoxy group together with the most different hardeners, and furthermore vinyl ester resins, maleic acid resins, phenolic resings, polymethacrylate resins and the like have proven satisfactory. All resins can be combined with each other in the individual layers, polyester resins being employed in the core layer and epoxy resins in the cover layer, for instance, depending upon the use.

The advantage of the invention is particularly significant if organic resin is replaced in the core material by inorganic matrix material. Thus concrete mixes of the customary composition are suitable for this as well as concrete mixes which are reinforced with glass fibers, for instance zirconium-glass, steel or other fibers, including ones of organic nature. Upon manufacture using polyester resin or other resin layers a water-compatible epoxy resin must first be applied to the core material.

Upon the production of tubes it will always be favorable to employ in the outer layers resins which are anti-corrosive and have a high modulus of elasticity together with the threads employed.

The process can not only be used for tubes of all customary diameters but containers can also be produced, it being possible to set up the apparatus in mobile manner on the spot so that containers of a diameter of up to 10 m or more can be produced. The shaping of the winding mandrels in addition permits the production of tapered or even non-circular bodies and thus also the manufacture of masts of any type or other shaped bodies.

It is also possible to use as a winding mandrel a tube formed of thermoplasts into which there is pressed, under the action of heat, a glass-fiber band which consists of radially and/or axially arranged rovings or of fabrics or mats. The core material is then wound over this winding mandrel, as indicated above.

If core material is wound in accordance with the invention onto, for instance, tubes of asbestos cement or steel, asbestos cement can for example be made considerably stiffer and more resistant to impact and can be laid even in corrosive soils. The same applies in corresponding manner to steel pipes which are to be placed as pump pipes "off-shore" in seawater or also in corrosive soils, for instance in marshy soils.

Heating tubes manufactured or processed in accordance with the invention are recommended for use in particular in long-distance heating systems as well as in chemical plants.

Finally, the diameter of the winding mandrel can also decrease towards one end so that masts can also be produced in accordance with the invention.

What is claimed is:

1. An improved apparatus for manufacturing tubular hollow bodies and particularly fiber-reinforced tubular hollow bodies, said bodies comprising at least one cover layer and at least one core layer, said apparatus comprising a means for supporting and rotating a mandrel upon which the core and cover layers are to be wrapped, means for guiding said core and cover layers to said rotating mandrel, a hopper adapted to receive and deliver a core material to said cover and core layer, wherein the improvement comprising a control unit which includes a compression tunnel having a free cross-section of passage defined by lower and opposite adjustable walls and side walls which taper down substantially continuously in the direcion of conveyance of the core layer to considerably reduce the thickness of the cover and core layers, said compression tunnel having at least one side channel extending in longitudinal direction through which the edge portion of the cover layer travels and is deflectable from the plane of the said compression tunnel, said compression tunnel further being adapted to apply compression forces perpendicular to the core layer, as well as tensile forces which act continuously and simultaneously on said core layer, both of which result in the formation of a uniform, homogenous, and stronger bond between said core and cover layers.

2. An improved apparatus for manufacturing tubular hollow bodies and particularly fiber-reinforced tubular hollow bodies, said bodies comprising at least one cover layer and at least one core layer, said apparatus comprising a means for supporting and rotating a mandrel upon which the core and cover layers are to be wrapped, means for guiding said core and cover layers to said rotating mandrel, a hopper adapted to receive and deliver a core material to said cover and core layer, wherein the improvement comprising a control unit which includes a compression tunnel having an approximately trapezoidal shaped free cross-section of passage defined by lower and opposite adjustable walls and side walls which taper down substantially continuously in the direction of conveyance of the core layer, said compression tunnel adapted to considerably reduce the thickness of the cover and core layers in the direction of conveyance through said compression tunnel, said compression tunnel further being adapted to apply compression forces perpendicular to the core layer, as well as tensile forces which act continuously and simultaneously on said core layer.

3. An apparatus according to claim 1, wherein the compression tunnel is attached to a hopper which feeds the core layer material to the compression material.

4. An apparatus according to claim 3, wherein the compression tunnel is attached laterally to the lower hopper part.

5. An apparatus according to claim 1, wherein the compression tunnel is connected to a pressure hose which feeds the core layer material.

6. An apparatus according to claim 1, wherein the compression tunnel has a baffle wall by which the core layer material fed is precompressed before it strikes against the cover layer.

7. An apparatus according to claim 1, wherein the lower inner wall of the compression tunnel is provided with holes.

* * * * *

UNITED STATES PATENT AND TRADEMARK OFFICE
CERTIFICATE OF CORRECTION

PATENT NO. : 4,657,623
DATED : April 14, 1987
INVENTOR(S) : Ludwig Wesch

It is certified that error appears in the above-identified patent and that said Letters Patent is hereby corrected as shown below:

In the Abstract --

Line 3 delete "on" and substitute -- one --

Line 11 delete "homogeous" and substitute -- homogeneous --

Signed and Sealed this

Twentieth Day of October, 1987

Attest:

DONALD J. QUIGG

*Attesting Officer*    *Commissioner of Patents and Trademarks*